United States Patent [19]

Karas et al.

[11] Patent Number: 5,182,772
[45] Date of Patent: Jan. 26, 1993

[54] METHOD AND APPARATUS FOR ENCODING, TRANSMITTING, RECEIVING AND DE-CODING INFORMATION

[75] Inventors: Christopher R. Karas, 9545 E. D Ave. Apt. 6, Richland, Mich. 49083; Carl B. Hoch, III, 4255 Alpenhorn, Apt. 9, Comstock Park, Mich. 49321

[73] Assignees: Christopher R. Karas; Carl B. Hoch, III

[21] Appl. No.: 667,176

[22] Filed: Mar. 11, 1991

[51] Int. Cl.$^5$ ............................................... H04K 1/00
[52] U.S. Cl. ........................................ 380/49; 380/54; 380/59
[58] Field of Search ................... 380/9, 49, 50, 54, 59

[56] References Cited

U.S. PATENT DOCUMENTS 5,027,401  6/1991  Soltesz ................................. 380/54

*Primary Examiner*—Salvatore Cangialosi

[57] ABSTRACT

A clear language dictionary of items of information to be transmitted is provided for composing messages and is also electronically impressed in first memory elements of sending and receiving computers. Each item of the dictionary is equated to a different octal number and the several octal numbers are impressed in second memories of both of the computers. The sending computer converts each selected item to its equated octal number, and then converts each digit of the equated octal numbers to successive groups of binary digits 0-0-0 to 1-1-1 taken from a color code which is impressed in third memories of both computers and in which the first digit of each group is equated to a first basic color, the second digit is equated to a second basic color, and the third digit is equated to a third basic color. Each group of binary digits is transmitted as a color coded group from the third memory of the sending computer, either as a binary color group on television or as optical colors singly or in combinations of colors. Three optically shielded light sensitive color receptors at the receiving station re-convert the color pulses to binary digit groups that are fed to the memory of the receiving computer for reverse de-coding and actuation of a printer to reproduce the message sent.

12 Claims, 1 Drawing Sheet

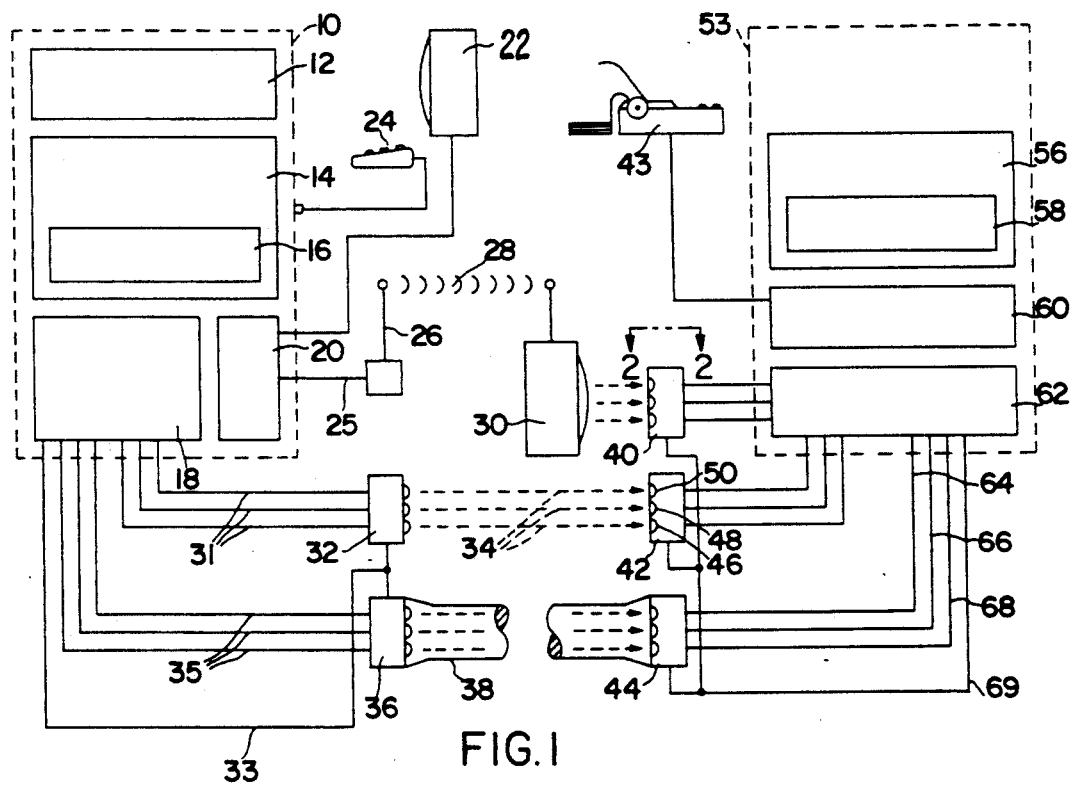
FIG.1
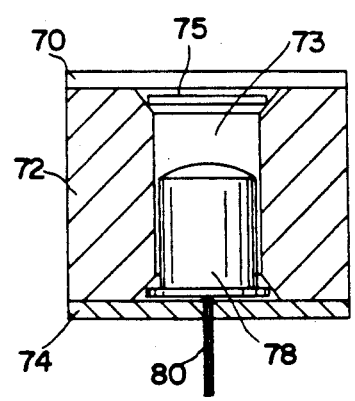
FIG.2
| 82 | 84 |
|---|---|
| AIR | 056 |
| ATTACK | 347 |
| BY | 211 |
| HELP | 777 |
| LAND | 133 |
| RETREAT | 622 |
| WATER | 460 |
FIG.3

METHOD AND APPARATUS FOR ENCODING, TRANSMITTING, RECEIVING AND DE-CODING INFORMATION

This invention relates to improvements in method and apparatus for encoding, transmitting, receiving, and de-coding information.

CROSS REFERENCES TO RELATED APPLICATIONS

Applicants are not aware of any related applications.

STATEMENTS AS TO RIGHTS TO INVENTIONS MADE UNDER FEDERALLY-SPONSORED RESEARCH AND DEVELOPMENT (IF ANY)

The invention was not made under any Federally-sponsored research and/or development grant.

BACKGROUND OF INVENTION

The invention relates to a new combination of known elements of Electronic Computers, Electric Light Sources and Sensors of Colored Light: together with Electronically actuated announcing or printing apparatus.

DESCRIPTION OF THE RELATED ART

The related arts of inscripting, transmitting, receiving, decoding and announcing de-coded information includes electrical and mechanical ciphers, cipher transposition, double transposition ciphers and opto-electronic communications. These art forms are employed in both the sending and receiving and recording of messages according to the invention. A category of "cryptography" would appear to be a proper classification.

SUMMARY OF THE INVENTION

A clear language dictionary of items of information to be transmitted is provided for composing messages and is also impressed in memory elements of sending and receiving computers. Each item of the dictionary is equated to a different octal number and the several octal numbers are impressed in memory elements of both computers. The sending computer converts each selected item to its equated octal number, and then converts each digit of the equated octal numbers to successive groups of binary digits 0-0-0 to 1-1-1 taken from a color code which is impressed in memory elements of both computers and in which the first digit of each binary group is equated to a first basic color, the second digit is equated to a second basic color, and the third digit is equated to a third basic color. Each group of binary digits is transmitted as a color coded group from the memory of the sending computer, either as a binary color group on television or as optical colors singly or in combinations of colors. Three optically shielded light sensitive color receptors at the receiving station re-convert the color pulses to binary digit groups which are then converted to octal numbers and equated to their corresponding dictionary items for reproduction of the message sent. This message is then printed out.

BRIEF DESCRIPTION OF THE DRAWINGS

The drawings of which there is one sheet, conventionally illustrate a preferred form of the invention, and include three alternative forms of transmission messages.

FIG. 1 is a diagrammatic and schematic representation of sending and receiving stations for using the method and apparatus of the invention.

FIG. 2 is a cross sectional view taken along the plane of the line 2—2 in FIG. 1 and looking in the direction of the arrows.

FIG. 3 is a fragmentary portion of a dictionary for using the code and the invention.

DETAILED DESCRIPTION

The sending station includes a computer generally indicated by the dotted enclosure 10, an associated keyboard 24, and a viewing screen 22 for composing messages. The computer 10 includes a control unit 12, a memory 14, a program 16, an output port 18, and a video port 20.

The system illustrated in FIG. 1 includes three alternatively operable transmission systems or paths for transmission of information. A cable 31, which includes three separate conductors, connects the output port 18 to a three color light projector 32 to produce a line of sight beam 34. Similarly, cable 35 connects the output port 18 to an alternative three color light projector 36. The light projector 36 is arranged to emit three colored lights, both singly and in combination, into the end of a fiber optic cable 38. Conductor 33 is the common reference for the light projectors. A third cable 25 connects from the video port 20 to activate a standard color television broadcast conventionally indicated by the antenna 26, which broadcasts universally, to be picked up or received by any television receiver over path 28.

The receiving ends of the three alternate transmission lines include a first three color light receptor 42 which receives color signals from the line of sight route 34. A second color light receptor 44 receives color signals from the end of the fiber optic cable 38, and a third color light receptor 40 receives color signals from the screen of a standard television receiver 30 via path 28. The receptors 40, 42 and 44 are similar and may be identical.

The structural details of the color receptors is shown in FIG. 2. A block 72 of opaque material has three bores 73 formed therethrough and each bore receives a photo conductor 78 with leads 80 projecting through a baseplate 74. Located in the opposite ends of the bores 73 are three different color filters 75, corresponding to filters 46, 48 and 50 in FIG. 1. Filter 46 passes only red light, filter 48 passes only green light, and filter 50 passes only blue light. A clear coverplate 70 holds the filters in place.

Conductors 64, 66, and 68, in FIG. 1, connect the three photoconductors in color receptor 44 to the Input port 62 of the receiving computer indicated by the dotted box 53. Conductor 69 is the common reference for the color receptors. The program 58 receives binary code groups from the input port 62 and converts the binary code groups to octal code groups which are stored in the memory 56 of the receiving computer. The program 58 converts each received octal code group to its equated information item to reproduce the information sent. These items are then physically reproduced on a printer 43.

The partial dictionary shown in FIG. 3 includes a list of items 82. Each item is equated to a different octal number in list 84 set opposite the item in the list 82.

OPERATION

The invention involves pulses of visible light, both singly and in combinations of colors, and further includes binary transmissions representing colored light.

Since output devices are generally slower than a stream of incoming light pulses, it is preferred that the information be stored in memory and then to a storage device such as a magnetic disk drive. The information can be sent to a physical output device when the transmission is complete. It is to be noted that television transmission 28 may involve more time delays than line of sight 34 or fiber optic 38 transmissions. To coordinate real time transmissions at both the sending and receiving computers, a synchronization code is sent to alert the receiving computer that a message is being sent. A fixed time interval is used to synchronize the duration of each light pulse during message transmissions and another synchronization code is sent to alert the receiving computer for end of message.

The dictionary of information items and octal numbers is impressed in the memory 14 of the sending computer so that each information item can be easily located and converted to its octal equivalent. The dictionary of information items and octal numbers is also impressed in the memory 56 of the receiving computer so that each octal number can be easily located and converted to its equivalent information item. It is noted that any base that is a power of 2 such as $2^3=8$, $2^4=16$, $2^5=32$, can be used to send information. The power of 2 used is equal to the number of dabs transmitted to represent one item. The size of the dictionary is $8^N$ where N is the power of 2 mentioned above. Thus, when using octal numbers ($2^3=8$), the number of dabs transmitted per item is 3, and the number of possible items in the dictionary is $8^3=512$.

After converting a selected item to its equivalent octal number, the program 16 of the sending computer successively converts each digit of the octal number to a three digit binary number. This binary number is directly equivalent to a pre-selected color code. This code is derived from the fact that each digit of the binary number turns a primary colored light on or off. By way of example, the octal number 325 is mathematically converted to binary 011,010,101. Arbitrarily assuming the order of the colored lights is red, green, blue, the binary figures transmitted would be 0,1,1=red-off, green-on, blue-on=cyan; 0,1,0=red-off, green-on, blue-off=green; 1,0,1=red-on, green-off, blue-on=magenta.

As an example of the method, it may be desired to transmit the message "ATTACK BY AIR." This is typed into the keyboard 24 of the sending computer. The program 16 takes the word "ATTACK" and searches the dictionary and then retrieves the equated octal code which is 347 and stores it in memory. If the word typed is not found in the dictionary, then the user must be informed. The user may decide to add the word to the dictionary or retype the word. After finding "ATTACK", the computer finds "BY" and its octal code 211, and "AIR" and its octal code 056. When the sending computer is instructedto transmit the message, the program 16 retrieves the three octal codes 347, 211, 056 and converts each to its binary equivalent. 3-4-7 is converted to 011-100-111. The binary number 011 is sent to the output port 18 which is connected to a three color light projector 32. The 0 does not activate the red light, the 1 activates the green light, and the next 1 activates the blue light. This happens simultaneously so that 011 sends a pulse of cyan light. Similarly, 100 sends a pulse of red light, and 111 sends a pulse of white light. Therefore, "ATTACK"=3-4-7=011-100-111=cyan-red-white. The other octal codes are transmitted as follows: 2-1-1 converts to 010-001-001 which is green-blue-blue; 0-5-6 converts to 000-101-110 which is black-magenta-yellow. The entire message "ATTACK BY AIR" is transmitted as a stream of colored lights: cyan-red-white-green-blue-black-magenta-yellow. The "space" between each word in the message is re-inserted by the receiving computer.

At the receiving station, each light pulse is filtered into its red, green and blue components by filters placed over three photo conductors. The first photo conductor is shielded by a red filter 50, the second photo conductor is shielded by a green filter 48, and the third photo conductor is shielded by a blue filter 46. As a color pulse is received, each photo conductor activates only if its color component is present. When activated, each photo conductor produces an electrical current which is compatible with the input port of the receiving computer. The input port determines if the current level present at a specific input is of sufficient amplitude to be a binary 1 or binary 0.

When the example message is received, each pulse of light is converted to a three digit binary number. So the stream of light pulses: cyan-red-white-green-blue-blue-black-magenta-yellow is sequentially converted to binary code groups: 011-100-111, 010-001, 000-101-110. The program in the receiving computer converts each binary code group back to its octal code group: 347, 211, 056 and then searches the dictionary for each octal code group and retrieves the equated information item. Since 347="ATTACK", 211="BY", and 056="AIR", the message "ATTACK BY AIR" is received and is physically reproduced on the printer 43.

VARIATIONS

The color receptors 46, 48, 50 each with its associated filter may be physically located at separate spaced positions, as at three corners of the screen of a television receiver 30. They can be any distance apart assuming they read the incoming color signals simultaneously. In the case of television, three randomly placed points of light on a TV screen would hardly be noticeable by the audience.

The length of the dictionary may be increased by adding more shades of colors to the basic color table. It may also be increased by sending more color pulses per information item. It is noted that the length of the dictionary is defined by the following formula:

length=(numeric base) to the power of (number of digits)

where numeric base is defined by how many color combinations are possible based on shades of the basic three colors red, green and blue. And number of digits is defined by how many digits of the numeric base are used to define one information item. As an example: using 4 shades of each red, green, and blue, the numeric base is the total number of combinations possible which is $2^{12}=4096$. Also assuming 8 digits of base 4096 are sent to represent one information item, the length of the dictionary would be $4096^8=7.923\times10^{28}$. A dictionary of this size would hold billions of words and each word could have many different octal codes which would increase the security of the system.

The equated values for information items do not have to remain constant. To reduce the possibility of breaking the codes established for a system, the equated values can be dynamically altered as a transmission is being sent. As an example, forward rotation of the octal equivalents would re-assign all octal numbers after every item is sent by shifting the octal equivalents and what they equate to. The receiving computer must be notified in advance and must start at the same time, following the same scheme of re-assigning values. This would cause the word ATTACK to have a different octal code every time any word is sent and assuming a large dictionary, would likely never have the same code transmitted more than once.

Multiple transmission lines may be implemented to facilitate parallel transmission for messages. This would decrease transmission time based on how many lines are used simultaneously.

What is claimed to be new and what is desired to be secured by Letters Patent is defined in the following claims:

1. The process of disseminating information which comprises the steps of:
   establishing a dictionary of items including letters, numerals, symbols, and words to be disseminated,
   equating each item of the dictionary to a different numerical code number,
   impressing the items and equated code numbers into memories of sending and receiving computers,
   impressing a color table of plural colors into memories of said sending and receiving computers,
   programming the sending computer to sequentially convert items of information to numerical code numbers, and sequentially convert each digit of each selected numerical code number to a binary code group using the binary code groups to control pre-determined light sources as defined in the color table to produce light pulses,
   transmitting the light pulses to a receiving station and using color filters to separate light components and activate photoconductors to receive the binary code groups sent,
   converting the binary code groups to the equivalent numerical code numbers and further converting the numerical code numbers to the equated items of the dictionary in the memory of the receiving computer,
   sequentially storing the received items as a clear message to a physical storage device,
   and then sequentially reporting the received items as a clear message to a physical output device.

2. The process as defined in claim 1 in which red, green and blue colors and filters are employed.

3. The process defined in claim 2 in which the color pulses are transmitted as optical light.

4. The process as defined in claim 3 in which the color pulses are transmitted as video signals to a standard television and then received by color receptors positioned in front of a television receiver.

5. The process as defined in claim 4 in which the basic colors that make up each color pulse are physically separated into pre-selected areas on the standard television screen and transmitted within a standard television program so that the color information is not perceived by the general public.

6. The process as defined in claim 3 in which the equated numerical code numbers are shifted in both the sending and receiving computers to equate to different dictionary items after a pre-determined event.

7. The process as defined in claim 3 in which the basic colors red, green and blue are divided into a pre-determined number of shades of red, green and blue and the photo-conductor color receivers are capable of distinguishing and receiving each shade of red, green and blue.

8. Apparatus for disseminating information which comprises a dictionary of items to be transmitted with each item equated to a different number,
   sending and receiving computers each having the dictionary and equated numbers impressed in their memories,
   the program of said sending computer being arranged to convert each item in-put into it to the equated number of the dictionary and in turn convert each digit of each in-put number to an octal number from a binary color code comprising plural different colors and combinations thereof as color pulses,
   means for transmitting the color pulses,
   means including plural light responsive conductors each shielded by a different color filter of said plural different colors and connected to the program of said receiving computer to convert the received color pulses to binary code,
   the program of the receiving computer being arranged to convert received binary code to octal code, then to numerical code from the dictionary and then to clear text items from the dictionary,
   and clear text display means connected to be actuated by the program of the receiving computer.

9. Apparatus as defined in claim 8 in which the means for transmitting the color pulses consists of three light sources for emitting red, green and blue light beams respectively.

10. Apparatus as defined in claim 9 in which the transmitting means further includes a fiberglass cable.

11. Apparatus as defined in claim 8 in which the means for transmitting the color pulses comprises a standard color television transmitter and a standard color television receiver,
    said light responsive conductors and their filters being positioned to receive light from the screen of the television receiver.

12. Apparatus as defined in claim 11 in which said light responsive conductors and their filters are physically separated and disposed in spaced relation over different portions of the screen of said television receiver.

* * * * *